(12) United States Patent
Satoh et al.

(10) Patent No.: US 9,204,108 B2
(45) Date of Patent: Dec. 1, 2015

(54) VEHICLE PERIPHERY MONITORING SYSTEM

(75) Inventors: Noriyuki Satoh, Tokyo (JP); Katsuichi Ishii, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 555 days.

(21) Appl. No.: 13/514,578

(22) PCT Filed: Dec. 7, 2009

(86) PCT No.: PCT/JP2009/070489
§ 371 (c)(1),
(2), (4) Date: Jun. 7, 2012

(87) PCT Pub. No.: WO2011/070641
PCT Pub. Date: Jun. 16, 2011

(65) Prior Publication Data
US 2012/0242834 A1    Sep. 27, 2012

(51) Int. Cl.
*H04N 7/18* (2006.01)
*B60R 1/00* (2006.01)

(52) U.S. Cl.
CPC *H04N 7/181* (2013.01); *B60R 1/00* (2013.01); *B60R 2300/105* (2013.01); *B60R 2300/304* (2013.01); *B60R 2300/60* (2013.01); *B60R 2300/8026* (2013.01)

(58) Field of Classification Search
CPC ....................................................... H04N 7/18
USPC .......................................................... 348/148
See application file for complete search history.

(56) References Cited

U.S. PATENT DOCUMENTS

| 7,012,616 B1* | 3/2006 | Chatterjee ...................... 345/592 |
| 7,277,123 B1* | 10/2007 | Okamoto et al. ............. 348/148 |
| 2003/0108222 A1 | 6/2003 | Sato et al. |
| 2004/0179099 A1* | 9/2004 | Bos et al. ....................... 348/148 |

(Continued)

FOREIGN PATENT DOCUMENTS

| JP | 2003-244688 A | 8/2003 |
| JP | 2004-201223 A | 7/2004 |

(Continued)

OTHER PUBLICATIONS

Corrected version of the International Search Report dated Jul. 24, 2012; International Application No. PCT/JP2009/070489.

(Continued)

*Primary Examiner* — Mehrdad Dastouri
*Assistant Examiner* — Jimmy S Lee
(74) *Attorney, Agent, or Firm* — Studebaker & Brackett PC

(57) ABSTRACT

A vehicle periphery monitoring system is provided, in which by matching a behavior of a semitransparent tire image with an operation from a driver's viewpoint, a feeling of strangeness is reduced, an intuitive space perception is assisted and also a moving direction and a behavior of a vehicle can be easily perceived. In a side-view monitor system an image processing controller converts a real camera image including a blind spot into an image to be viewed from a driver's viewpoint to generate a blind spot image, and superimposes a semitransparent vehicle image which is obtained by making a vehicle viewed from the driver's viewpoint semitransparent and a semitransparent tire image which is obtained by making a tire semitransparent and displaying a behavior following a handle operation viewed from the driver's viewpoint on the blind spot image.

2 Claims, 13 Drawing Sheets

(56) References Cited

U.S. PATENT DOCUMENTS

2009/0244284 A1* 10/2009 Suita et al. .................. 348/148
2009/0262192 A1* 10/2009 Schofield et al. ............ 348/148
2010/0007734 A1* 1/2010 Yamazaki et al. ............ 348/148

FOREIGN PATENT DOCUMENTS

| JP | 2004-350303 | A | 12/2004 |
| JP | 2005-335410 | * | 12/2005 |
| JP | 2005-335410 | A | 12/2005 |
| JP | 2007-311898 | A | 11/2007 |
| JP | 2008-085691 | * | 4/2008 |
| JP | 2008-085691 | A | 4/2008 |

OTHER PUBLICATIONS

International Search Report; PCT/JP2009/070489; Feb. 9, 2010.

* cited by examiner

FIG.2
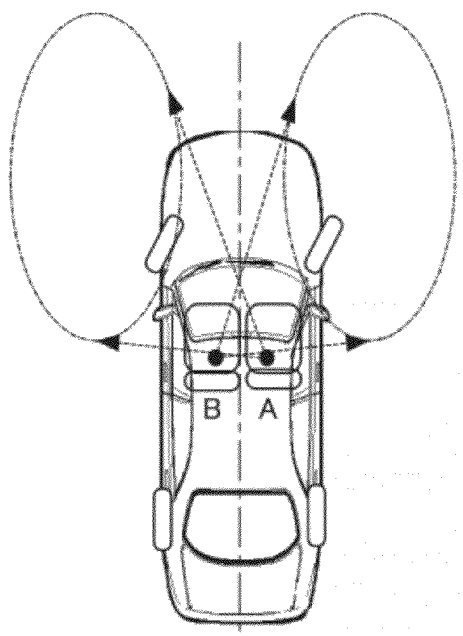
FIG.3
(a)
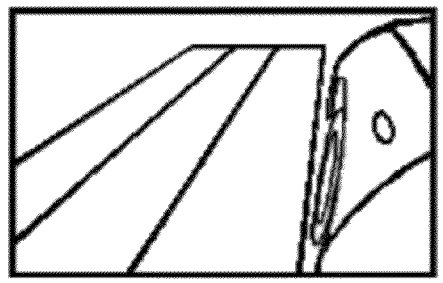
LEFT SIDE CAMERA IMAGE
(c)
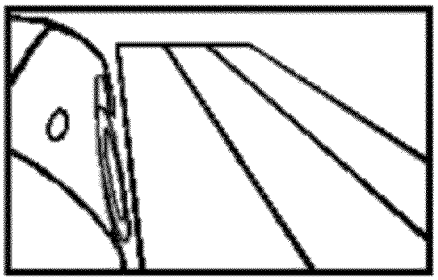
RIGHT SIDE CAMERA IMAGE
(b)
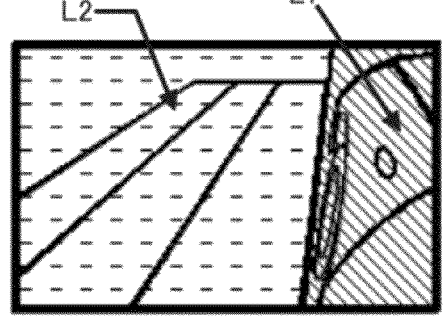
LEFT IMAGE BLOCK DIVISION
(d)
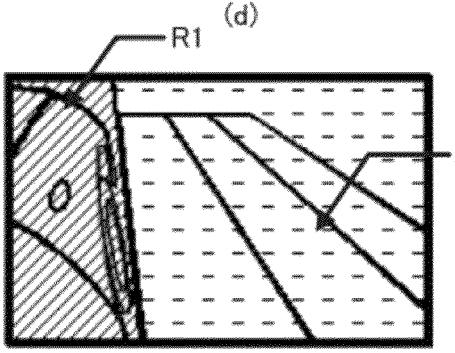
RIGHT IMAGE BLOCK DIVISION

FINAL OUTPUT IMAGE (a) PERIPHERY IMAGE R2
(b) CONVERSION IMAGE Ga2 VIEWED FROM VIRTUAL VIEWPOINT A (a) VEHICLE IMAGE R1
(b) CONVERSION IMAGE Ga1 VIEWED FROM VIRTUAL VIEWPOINT A (a) PERIPHERY IMAGE L2
(b) CONVERSION IMAGE Mb2 VIEWED FROM VIRTUAL VIEWPOINT B (a) VEHICLE IMAGE L1
(b) CONVERSION IMAGE Mb1 VIEWED FROM VIRTUAL VIEWPOINT B
(c) IMAGE Gb3 AFTER MIRROR IMAGE CONVERSION (c) FINAL OUTPUT IMAGE

NORMAL MAIN IMAGE

IMAGE SHIFTED IN VIEW OF TIRE WIDTH

SUPERIMPOSING ONLY TIRE PART AGAIN

EXAMPLE OF CHANGES OF TRANSMISSIVITY OF TIRE PART

VEHICLE PERIPHERY MONITORING SYSTEM

CROSS REFERENCE TO RELATED APPLICATIONS

The present application claims priority to International Patent Application No. PCT/JP2009/070489 filed Dec. 7, 2009, the entire contents of the application being incorporated herein by reference in its entirety.

FIELD OF THE INVENTION

The present invention relates to a vehicle periphery monitoring system expressing a blind area to be viewed through a vehicle as if the blind area is viewed from a driver's viewpoint on a monitor image.

BACKGROUND

Conventionally, as an image conversion application example of a side-view monitor system which is an example of a vehicle periphery monitoring system, constructing a system has been proposed, in which a driver more easily recognizes an image of a side camera by using a viewpoint conversion technology (see Japanese Patent Application Publication No. 2008-85691).

The purpose of the proposal is to eliminate a disparity caused from a difference between a viewpoint of the camera and that of the driver and to perform an image conversion so as to intuitively perceive a shape or the like.

That is, since the current camera for side-view monitor is provided inside of a side mirror, there is a disparity from the driver's viewpoint and a shape of an obstacle or the other object in the camera image is completely different from a shape which is viewed from a driver's seat. In a normal case, by being accustomed, the driver reconstitutes the camera image in his head and reconstructs and judges the positional relationship of the objects to be matched with the image viewed by the driver.

In such a case, in a case of the driver who is not accustomed or in an instant situation, a consistency between the image on the screen and the image viewed by the driver is degraded and a feeling of strangeness occurs. In order to solve the problems, in the above mentioned proposal, an image conversion of the camera image into an image (camera image) which is to be viewed by the driver is performed so as to minimize the influence.

Furthermore, as a feature of the expression method, it is supposed that a camera image is divided into two and an image conversion processing on each camera image is performed. More specifically, the image is divided into an image part of a vehicle which is included in the image and an image including an external blind part. The former is projected on a virtual vertical screen and converted into an image to be viewed from the driver's viewpoint, the latter is projected on a virtual horizontal screen and converted into an image to be viewed from the driver's viewpoint and the two images are superimposed and displayed.

As a result, the external blind image obtained by being converted into an image from the driver's viewpoint can be viewed through a semitransparent vehicle body. However, the semitransparent vehicle body image in this case is a mirror image of the vehicle body viewed from outside. As described above, the semitransparent vehicle image is implemented.

Even in the case of the mirror image, since the image of the actual vehicle body is superimposed, a size in forward and back directions, a sense for a distance and the like with respect to the viewpoint conversion image of the blind camera can be understood from a tire position and an image of a door. Therefore an intuitive perception can be effectively obtained and contribution to safe driving can be provided.

However, in specifically implementing the conventional side-view monitor system, there are the following problems of visibility.

That is, a semitransparent vehicle image is an actual vehicle image and a tire behavior and the like are actual movements and therefore high reliability with respect to response and the like can be provided. However, due to this viewpoint conversion method, the actual vehicle is converted to a form viewed from a back side and therefore the image is necessarily a mirror image and a direction of a turning angle of a handle is an opposite direction. That is, when turning right, the tire image turns left in a line-symmetrical manner and a feeling of strangeness occurs. This causes a problem that a sensory deviation becomes large when making consistency with an operation when turning due to use of the actual image.

The present invention is made while addressing the above problems and to provide a vehicle periphery monitoring system where, by matching a behavior of a semitransparent tire image to be superimposed with an operation from a driver's viewpoint, a feeling of strangeness is eliminated and intuitive space perception is assisted and also a vehicle moving direction and behavior can be easily perceived.

SUMMARY

In order to achieve the above object, in the present invention, a blind spot camera imaging a blind spot area from a driver, an external monitor set at a position in a vehicle interior to be visually confirmed by the driver, and a monitor display image data generating means generating monitor display image data based on a real camera image input from the blind spot camera. In the vehicle periphery monitoring system, the monitor display image data generating means converts the real camera image from the blind spot camera, which includes a blind spot area into an image to be viewed from a driver's viewpoint to generate a blind spot image, and performs an image composition superimposing a semitransparent vehicle image which is obtained by making a vehicle viewed from the driver's viewpoint semitransparent and a semitransparent tire image which is obtained by making a tire semitransparent and displays a behavior following a handle operation by being viewed from the driver's viewpoint on the blind spot image to generate the monitor display image data expressing the blind spot through the semitransparent vehicle image and semitransparent tire image.

Therefore, in a vehicle periphery monitoring system according to the present invention, the blind spot image is generated by converting the real camera image from the blind spot camera, which includes a blind spot area, into an image to be viewed from a driver's viewpoint. An image composition is performed, which superimposes a semitransparent vehicle image which is obtained by making a vehicle viewed from the driver's viewpoint semitransparent and a semitransparent tire image, which is obtained by making a tire semitransparent and displays a behavior following a handle operation viewed from the driver's viewpoint, on the blind spot image to generate monitor display image data expressing the blind spot image through the semitransparent vehicle image and the semitransparent tire image from the driver's viewpoint. Therefore, the monitor display image data expressing the blind spot image through the semitransparent vehicle image and the semitransparent tire image from the driver's viewpoint is generated.

That is, the tire image displayed on the external monitor is an image expressing a position and a direction as if the actual tire is viewed from the driver's viewpoint and therefore a feeling of strangeness to the driver is eliminated, and intuitive space perception of the blind spot from the driver's viewpoint is assisted. Furthermore, the tire image displayed on the external monitor is a tire behavior in conjunction with a handle turning angle so that the moving direction of the vehicle or the vehicle behavior can easily perceived based on the tire image.

As a result, by matching the behavior of the semitransparent tire image to be superimposed with the operation from the driver's viewpoint, the feeling of strangeness is eliminated and intuitive space perception is assisted and also the moving direction of the vehicle and the vehicle behavior can easily perceived.

BRIEF DESCRIPTION OF DRAWINGS

FIG. 2 is a plan view of a vehicle showing a driver's viewpoint, an assistant driver's viewpoint, and imaging areas by left and right side cameras.

FIG. 3 is an explanatory view showing division of the left and right side camera images [(a) left side camera image, (b) block division of a left image into a vehicle image L1 and a periphery image L2, (c) right side camera image, and (d) block division of a right image into a vehicle image R1 and a periphery image R2].

MODE FOR CARRYING OUT THE INVENTION

Hereinafter, the best modes carrying out a vehicle periphery monitoring system of the present invention will be explained based on Embodiment 1 and Embodiment 2 shown in drawings.

With the most characteristic function in the conventional technology (Japanese Patent Application Publication No. 2008-85691), that is, a function of projecting an actual image which is made semitransparent on a vertical virtual screen and combining and displaying the image with an external camera image which is obtained by performing a viewpoint conversion, a feeling of strangeness occurs because a behavior of the actual tire is displayed as a mirror image. The present invention is to eliminate the feeling of strangeness while maintaining the characteristic function. As a specific method to eliminate the feeling of strangeness, two methods are proposed.

One method has two systems and uses images including left and right tires, that is, a composite representation of a right real image is made as a left tire behavior and a composite representation of a left real image is made as a right tire behavior (Embodiment 1: two system left and right exchange display).

The other method expresses a tire by a computer graphics (hereinafter, "CG") and moves a CG tire according to a turning angle of a handle to express a current moving direction, or the like (Embodiment 2: CG tire display).

By using either one of the above methods, a turning direction of the tire is matched and the turning angle of the handle are matched with a driver's sense so that the feeling of strangeness is eliminated, intuitive space perception is assisted and a moving direction or behaviors of the vehicle can easily perceived.

First, a configuration will be explained.

Figure 1:
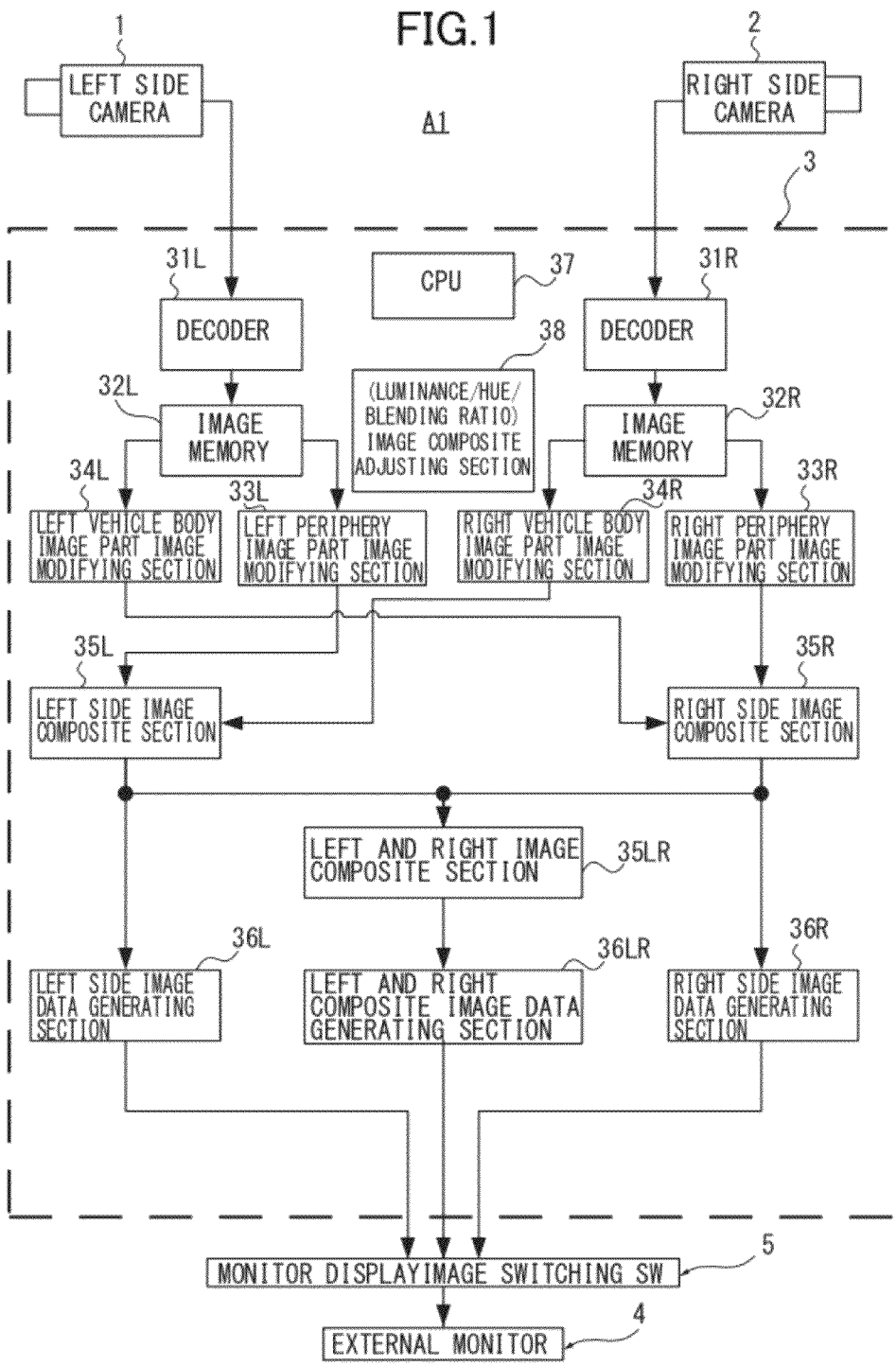
FIG. 1 is a system block diagram showing an entire system of a side-view monitor system A1 of Embodiment 1.

FIG. 1 is a system block diagram showing an entire system of a side-view monitor system A1 (an example of a vehicle periphery monitoring system) of Embodiment 1.

The side-view monitor system A1 of Embodiment 1 includes, as shown in FIG. 1, a left side camera 1 (blind spot camera), a right side camera 2 (blind spot camera), an image processing controller 3 (monitor display image data generating means), an external monitor 4, and a monitor display image switching switch 5.

The left side camera 1 is installed in a left side mirror and images a left side front area of a vehicle, which is in a blind spot from the driver. Then, the left side camera 1 obtains real camera image data by an image pickup device (CCD, CMOS, or the like).

The right side camera 2 is installed in a right side mirror and images a right side front area of the vehicle, which is in a blind spot from the driver. Then, the right side camera 2 obtains real camera image data by an image pickup device (CCD, CMOS, or the like).

The image processing controller 3 generates monitor display image data based on the real camera images input from the left side camera 1 and the right side camera 2. Basically, the image processing controller 3 is formed by two systems of image processing blocks which perform viewpoint conversions into a driver's viewpoint based on the camera images. Then, the image processing controller 3 uses the images including the left and right tires, performs a composite representation of the right real image as the left tire behavior and performs a composite representation of the left real image as the right tire behavior.

The external monitor 4 has a monitor screen by a liquid crystal display, a organic EL display, or the like and is set at a position (for example, a position of an instrumental panel) in a vehicle interior to be viewed by the driver. As the external monitor 4, an external monitor for exclusive use in the side-view monitor system A1 may be set. Furthermore, an external monitor for exclusive use in a system using a blind spot elimination camera may be set. Moreover, an external monitor of another system such as a navigation system or the like may be used.

The monitor display image switching switch 5 is a means switching an image to be displayed on the external monitor 4 among the left side image, the right side image, or a left and right composite image. As the monitor display image switching switch 5, for example, a switch to display an image selection mode on the screen of the external monitor 4 and select one by a screen touch system may be used.

The image processing controller 3 includes, as shown in FIG. 1, a decoder 31L, a decoder 31R, an image memory 32L, an image memory 32R, a left periphery image part image modifying section 33L, a right periphery image part image modifying section 33R, a left vehicle body image part image modifying section 34L, a right vehicle body image part image modifying section 34R, a left side image composite section 35L, a right side image composite section 35R, a left and right image composite section 35LR, a left side image data generating section 36L, a right side image data generating section 36R, a left and right composite image data generating section 36LR, a CPU 37, and an image composite adjusting section 38.

The decoder 31L performs an analog-digital conversion of the real camera image input from the left side camera 1 and stores the image in the image memory 32L.

The decoder 31R performs an analog-digital conversion of the real camera image input from the right side camera 2 and stores the image in the image memory 32R.

The left periphery image part image modifying section 33L divides the real camera image data from the image memory 32L into a left periphery image part (left blind part) and a left vehicle body image part, projects the left periphery image part on a virtual horizontal screen therefrom and performs a modifying processing by a viewpoint conversion processing to form an image to be viewed from the driver's viewpoint.

The right periphery image part image modifying section 33R divides the real camera image data from the image memory 32R into a right periphery image part (right blind part) and a right vehicle body image part, projects the right periphery image part on a virtual horizontal screen therefrom and performs a modifying processing by a viewpoint conversion processing to form an image to be viewed from the assistant driver's viewpoint.

The left vehicle body image part image modifying section 34L divides the real camera image data from the image memory 32L into a left periphery image part and a left vehicle body image part (including a left tire), projects the left vehicle body image part on a virtual vertical screen therefrom, performs a modifying processing by a viewpoint conversion processing to form images to be viewed from the driver's viewpoint and the assistant driver's viewpoint and makes them semitransparent to form semitransparent left vehicle body images.

The right vehicle body image part image modifying section 34R divides the real camera image data from the image memory 32R into a right periphery image part and a right vehicle body image part (including a right tire), projects the right vehicle body image part on a virtual vertical screen therefrom, performs a modifying processing by a viewpoint conversion processing to form images to be viewed from the assistant driver's viewpoint and the driver's viewpoint and makes them semitransparent to form semitransparent right vehicle body images.

The left side image composite section 35L generates a left side image by an image composite superimposing the semitransparent right vehicle body image by the assistant driver's viewpoint from the right vehicle body image part image modifying section 34R on the left periphery image by the driver's viewpoint from the left periphery image part image modifying section 33L. Then, based on the left side image, in the left side image data generating section 36L having an encoder function, left side image data expressing the left periphery image (corresponding to a blind spot image) through the semitransparent right vehicle body image (corresponding to a semitransparent vehicle image and a semitransparent tire image) by the driver's viewpoint is generated.

The right side image composite section 35R generates a right side image by an image composite superimposing the semitransparent left vehicle body image by the assistant driver's viewpoint from the left vehicle body image part image modifying section 34L on the right periphery image by the driver's viewpoint from the right periphery image part image modifying section 33R. Then, based on the right side image, in the right side image data generating section 36R having an encoder function, right side image data expressing the right periphery image (corresponding to a blind spot image) through the semitransparent left vehicle body image (corresponding to a semitransparent vehicle image and a semitransparent tire image) by the driver's viewpoint is generated.

The left and right image composite section 35LR combines the left side image from the left side image composite section 35L and the right side image from the right side image composite section 35R to generate a left and right image. Then, based on the left and right image, in the left and right composite image data generating section 36LR, left and right composite image data where the right side image data and the left side image data are combined is generated.

The CPU 37 is a central processing circuit managing all information processings and control outputs with respect to image processings and in the CPU 37, a control program performing various image processing controls such as a viewpoint conversion, image composition, and the like.

The image composite adjusting section 38 finally adjusts luminance, saturation, transparency, and the like based on an output image of each of the left side image composite section 35L, the right side image composite section 35R, the left and right image composite section 35LR, and outputs to the external monitor 4.

Next, operations will be explained.

In recent years, as part of entire periphery monitor systems, and as part of a promotion of driving assistance systems, multi-camera vehicles have been increased and an install of a camera at a right side in addition to that at a left side has become common. Embodiment 1 uses a vehicle where at least the left and right cameras 1, 2 are installed. Hereinafter, operation in the side-view monitor system A1 of Embodiment 1 is explained by dividing into a "camera image dividing operation", a "left side monitor image generation operation", a "right side monitor image generation operation", and a "tire thickness expression operation".

Camera Image Dividing Operation

First, in order to clearly distinguish left or right in tire behaviors, as shown in FIG. 2, a case where, by slightly turning a handle right, both of left and right front tires which are wheels to be turned have wheel turning angles toward right is assumed.

With respect to the side cameras 1, 2 installed at left and right, each real camera image is divided into a vehicle body image part and other periphery image part. That is, FIG. 3(a) is the left side camera image and the left side camera image is, as shown in FIG. 3(b), divided into blocks where a vehicle body image part including a vehicle body part is set as a vehicle image L1 and the other periphery image part which is in a blind spot at a left side of the vehicle is set as a periphery image L2 in the left side camera 1. Furthermore, FIG. 3(c) is a right side camera image and the right side camera image is, as shown in FIG. 3(d), divided into blocks where a vehicle body image part including a vehicle body part is set as a vehicle image R1 and the other periphery image part which is in a blind spot at a right side of the vehicle is set as a periphery image R2 in the right side camera 2.

By the block division of the images, in the vehicle image L1, a real image of the left side vehicle body and also a real image of a left tire are included and in the vehicle image R1, a real image of the right side vehicle body and also a real image or a right tire are included.

Left Side Monitor Image Generation Operation

Steps for generating a left side monitor image will be explained below.

Figure 4:
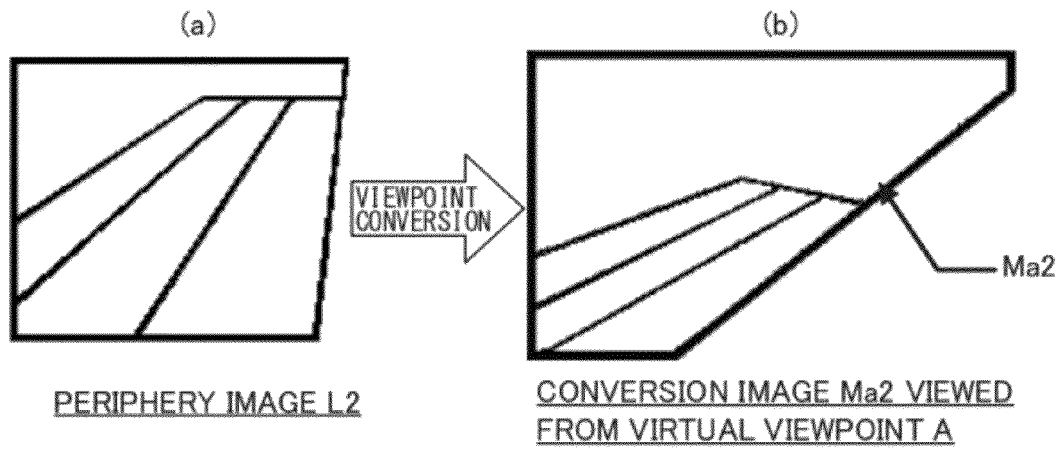
FIG. 4 is an explanatory view showing a viewpoint conversion by a driver's viewpoint A by using an image of a left side camera 1 [(a) periphery image L2, (b) conversion image Ma2].
Figure 5:
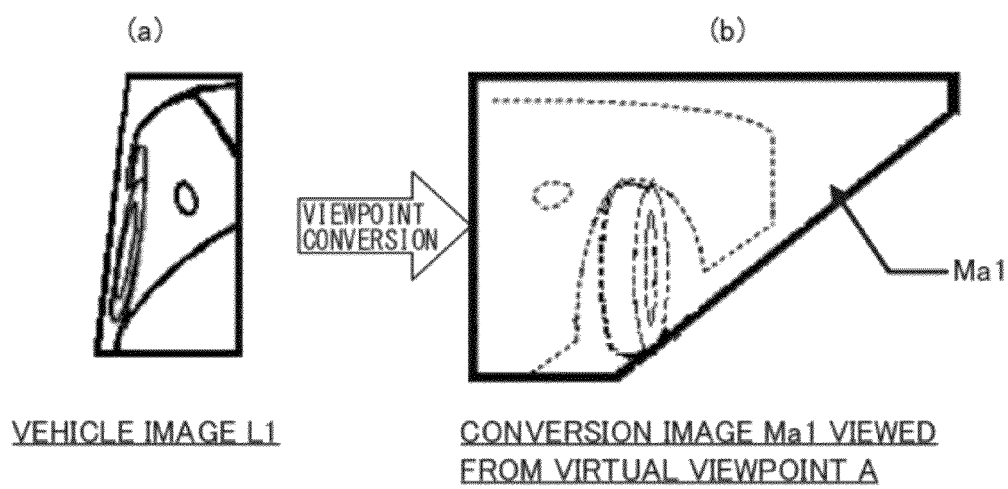
FIG. 5 is an explanatory view showing a viewpoint conversion by the driver's viewpoint A by using an image of the left side camera 1 [(a) vehicle image L1, (b) conversion image Ma1].

A viewpoint conversion image using an image of the left side camera 1 is formed as a conversion image to be viewed from a position A (driver's viewpoint) shown in FIG. 2. Thereby, if the periphery image L2 shown in FIG. 4(a) is viewed from the driver's viewpoint A which is a virtual viewpoint, a conversion image Ma2 shown in FIG. 4(b) is obtained. Furthermore, if the vehicle image L1 shown in FIG. 5(a) is viewed from the driver's viewpoint A which is a virtual viewpoint and made semitransparent, a semitransparent conversion image Ma1 shown in FIG. 5(b) is obtained.

Figure 6:
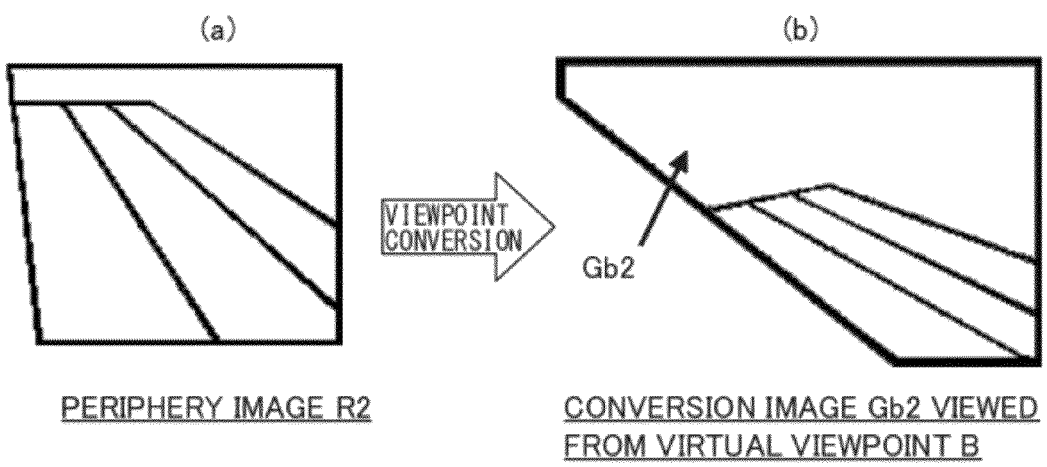
FIG. 6 is an explanatory view showing a viewpoint conversion by an assistant driver's viewpoint B by using an image of a right side camera 2 [(a) periphery image R2, (b) conversion image Gb2].
Figure 7:
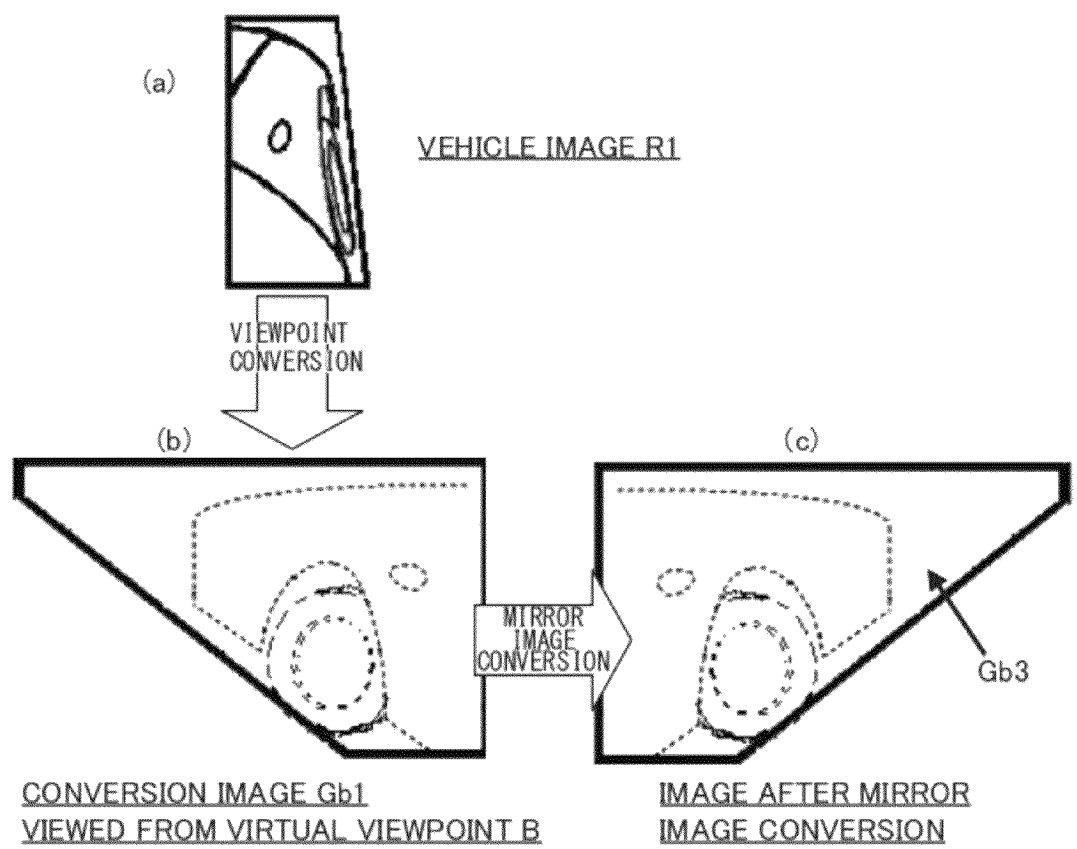
FIG. 7 is an explanatory view showing a viewpoint conversion by the assistant driver's viewpoint B by using an image of the right side camera 2 [(a) vehicle image R1, (b) conversion image Gb1, and (c) semitransparent mirror image conversion image Gb3].

Furthermore, a viewpoint conversion image using an image of the right side camera 2 is formed as a conversion image to be viewed from a position B (assistance driver's viewpoint) shown in FIG. 2, which is obtained by converting the position A in a line-symmetrical manner with a center axis of the vehicle. Thereby, if the periphery image R2 shown in FIG. 6(a) is viewed from the assistant driver's viewpoint B which is a virtual viewpoint, a conversion image Gb2 shown in FIG. 6(b) is obtained. Furthermore, if the vehicle image R1 shown in FIG. 7(a) is viewed from the assistant driver's viewpoint B which is a virtual viewpoint and made semitransparent, a semitransparent conversion image Gb1 shown in FIG. 7(b) is obtained. The semitransparent conversion image Gb1 is converted into a mirror image, and thereby a semitransparent mirror image conversion image Gb3 shown in FIG. 7(c) is obtained.

In the conventional method, the images of the semitransparent conversion image Ma1 and the conversion image Ma2 are formed such that the image of the conversion image Ma2 through the semitransparent conversion image Ma1 by an α-blend adjusting transmissivity of the semitransparent conversion image Ma1. However, here, a left side blind spot image of the conversion image Ma2 and a right side vehicle body image of the semitransparent conversion image Gb1 are used. The semitransparent conversion image Gb1 is substantially identical to the mirror image of the semitransparent conversion image Ma1 in shapes and sizes. However, only operation of the turning angle of the tire with the handle is opposite.

Then, a left and right mirror image conversion is performed again on the semitransparent conversion image Gb1 to form a semitransparent mirror image conversion image Gb3. The semitransparent mirror image conversion image Gb3 is substantially identical to the semitransparent conversion image Ma1 other than tire behavior by a handle operation as a result and is replaceable.

Figure 8:
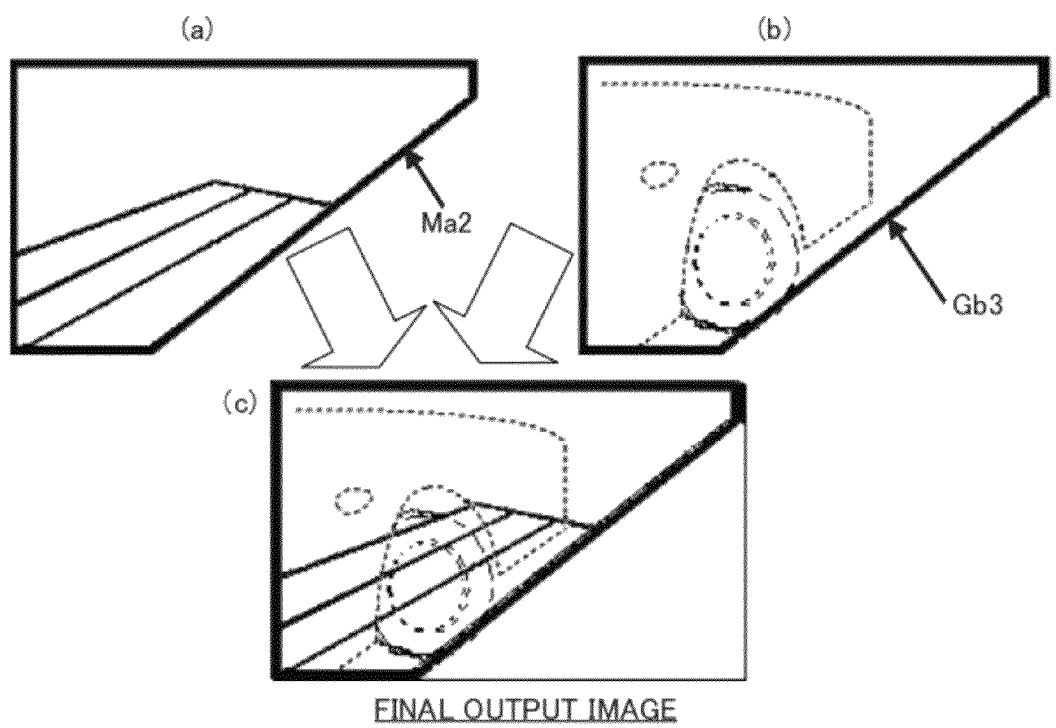
FIG. 8 is an explanatory view showing an image composite processing of the left side image [(a) conversion image Ma2, (b) semitransparent mirror image conversion image Gb3, and (c) superimposed screen where the semitransparent mirror image conversion image Gb3 is superimposed on the conversion image Ma2 and displayed].

Next, as shown in FIG. 8, by superimposing the semitransparent mirror image conversion image Gb3 on the conversion image Ma2 (FIG. 8(a)) and displaying, a superimposed screen (FIG. 8(c)) providing a tire behavior sensuously corresponding to a turning angle of a handle as the tire moves right when turning the handle right is formed.

Right Side Monitor Image Generation Operation

Steps for generating a right side monitor image will be explained below.

Figure 9:
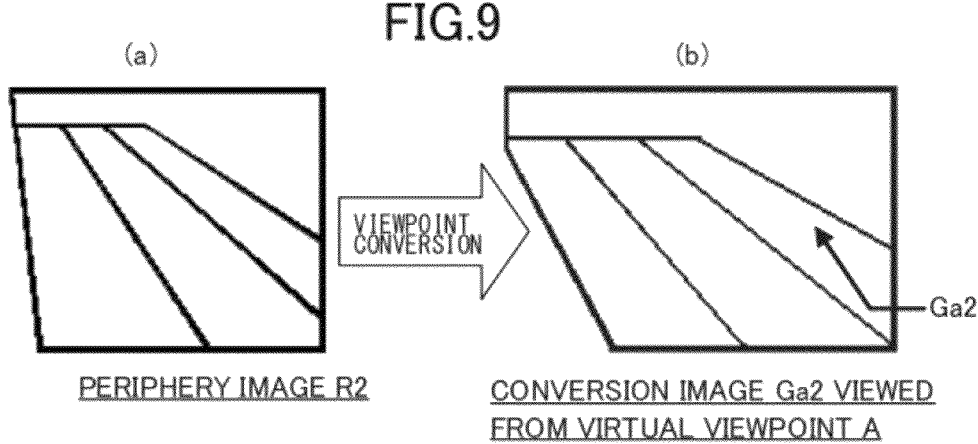
FIG. 9 is an explanatory view showing a viewpoint conversion by the driver's viewpoint A by using an image of the right side camera 2 [(a) periphery image R2, (b) conversion image Ga1].

A viewpoint conversion image using an image of the right side camera 2 is formed as a conversion image to be viewed from the position A (driver's viewpoint) shown in FIG. 2. Thereby, if the periphery image R2 shown in FIG. 9(a) is viewed from the driver's viewpoint A which is a virtual viewpoint, a conversion image Ga2 shown in FIG. 9(b) is obtained.

Figure 10:
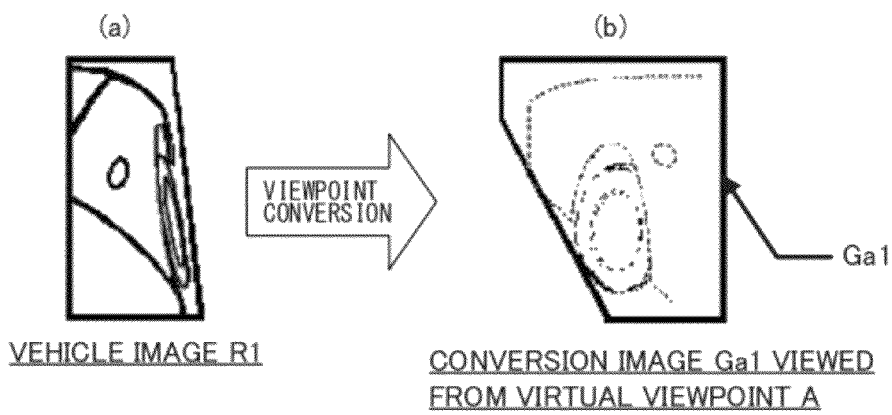
FIG. 10 is an explanatory view showing a viewpoint conversion by the driver's viewpoint A by using an image of the right side camera 2 [(a) vehicle image R1, (b) semitransparent conversion image Ga1].

Furthermore, if the vehicle image R1 shown in FIG. 10(a) is viewed from the driver's viewpoint A which is a virtual viewpoint and made semitransparent, a semitransparent conversion image Ga1 shown in FIG. 10(b) is obtained.

Figure 11:
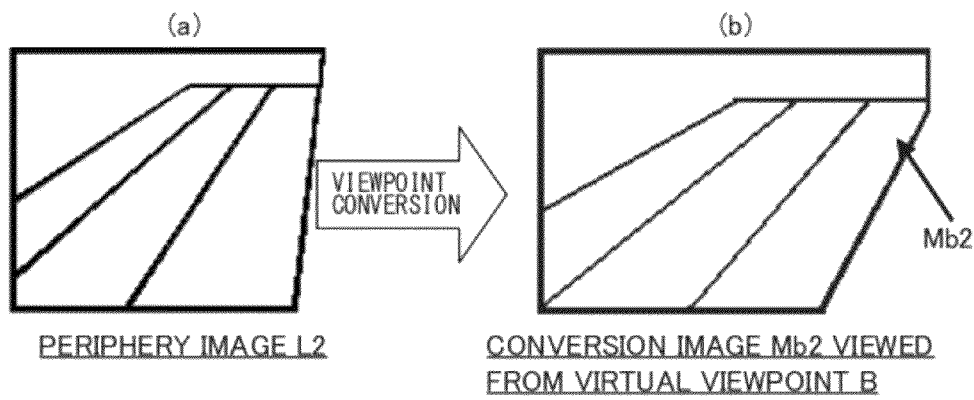
FIG. 11 is an explanatory view showing a viewpoint conversion by the assistant driver's viewpoint B by using an image of the left side camera 1 [(a) periphery image L2, (b) conversion image Mb2].
Figure 12:
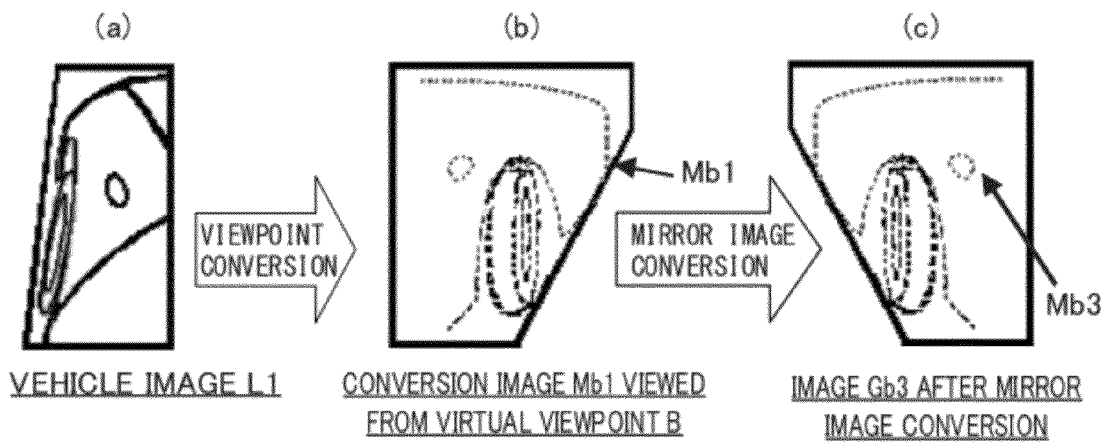
FIG. 12 is an explanatory view showing a viewpoint conversion by the assistant driver's viewpoint B by using an image of the left side camera 1 [(a) vehicle image L1, (b) semitransparent conversion image Mb1, and (c) semitransparent mirror image conversion image Mb3].

Furthermore, a viewpoint conversion image using an image of the left side camera 1 is formed as a conversion image to be viewed from the position B (assistance driver's viewpoint) shown in FIG. 2, which is obtained by converting the position A in a line-symmetrical manner with the center axis of the vehicle. Thereby, if the periphery image L2 shown in FIG. 11(a) is viewed from the assistant driver's viewpoint B which is a virtual viewpoint, a conversion image Mb2 shown in FIG. 12(b) is obtained. Furthermore, if the vehicle image L1 shown in FIG. 12(a) is viewed from the assistant driver's viewpoint B which is a virtual viewpoint and made semitransparent, a semitransparent conversion image Mb1 shown in FIG. 12(b) is obtained. The semitransparent conversion image Mb1 is converted into a mirror image, and thereby a semitransparent mirror image conversion image Mb3 shown in FIG. 12(c) is obtained.

Here, a right side blind spot image of the conversion image Ga2 and a left side vehicle body image of the semitransparent conversion image Mb1 are used. The semitransparent conversion image Mb1 is substantially identical to the mirror image of the semitransparent conversion image Ga1 in shapes and sizes. However, only operation of the turning angle of the tire with the handle is opposite.

Then, a left and right mirror image conversion is performed again on the semitransparent conversion image Mb1 to form a semitransparent mirror image conversion image Mb3. The semitransparent mirror image conversion image Mb3 is substantially identical to the semitransparent conversion image Ga1 other than tire behavior by a handle operation as a result and is replaceable.

Figure 13:
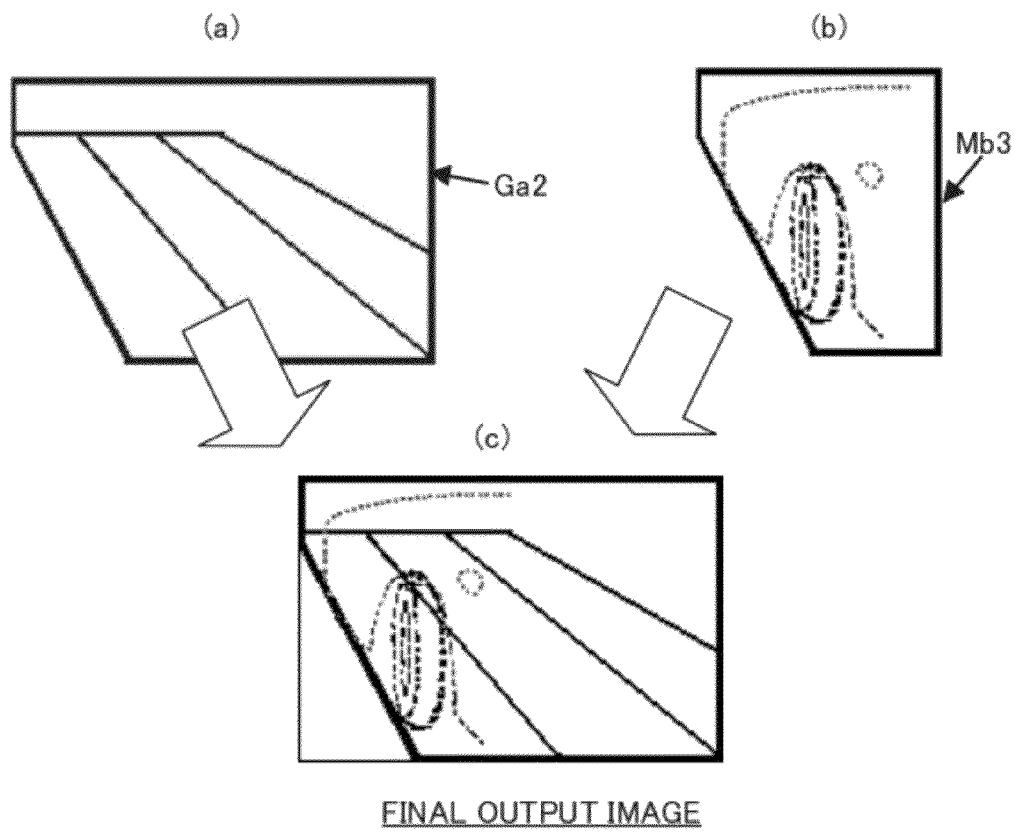
FIG. 13 is an explanatory view showing an image composite processing of the right side image [(a) conversion image Ga2, (b) semitransparent mirror image conversion image Mb3, and (c) superimposed screen where the semitransparent mirror image conversion image Mb3 is superimposed on the conversion image Ga2 and displayed].

Next, as shown in FIG. 13, by superimposing the semitransparent mirror image conversion image Mb3 on the conversion image Ga2 (FIG. 13(a)) and displaying, a superimposed screen (FIG. 13(c)) performing a tire behavior sensuously corresponding to a turning angle of a handle as the tire moves right when turning the handle right is formed.

Tire Thickness Expression Operation

The image formed as describe above is based on an image of a front side included in both of the side cameras 1, 2, that is, a surface of the vehicle body, and therefore appears an image of a vehicle formed only by a thin steel plate with a thickness of 0 (zero) or a vehicle formed by a wire frame which is viewed through from inside of the vehicle.

Figure 14:
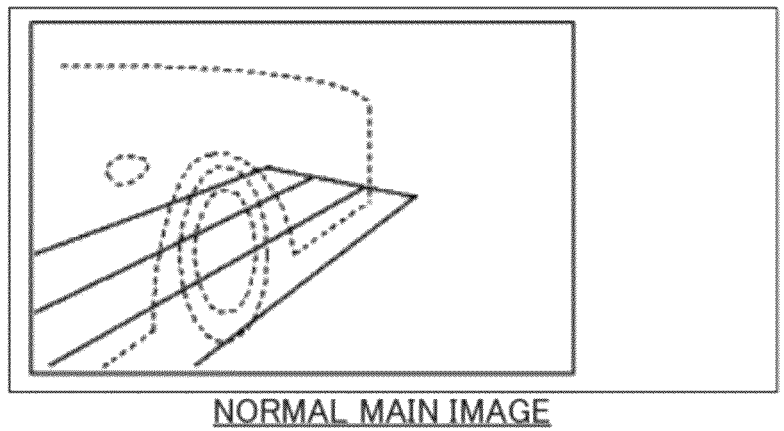
FIG. 14 is a monitor image view showing a main image (left side image) of a normal external monitor.

Therefore, as shown in FIG. 14, the thickness of the tire disappears and there may be a feeling of strangeness between the sense when expressing the turning angle and the image. That is, in the case where the real image of the side camera, which includes the tire, is used, the vehicle body image to be a semitransparent image appears planar and also the tire appears planar. Therefore the tire does not have thickness in the movement of the tire when turning the handle or getting around an obstacle to cause a feeling of strangeness.

Figure 15:
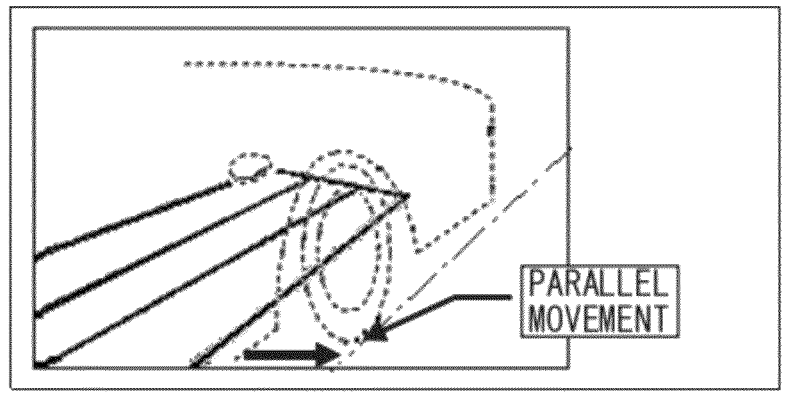
FIG. 15 is a monitor image view showing the main image (left side image) of the external monitor, which is shifted by a tire width.
Figure 16:
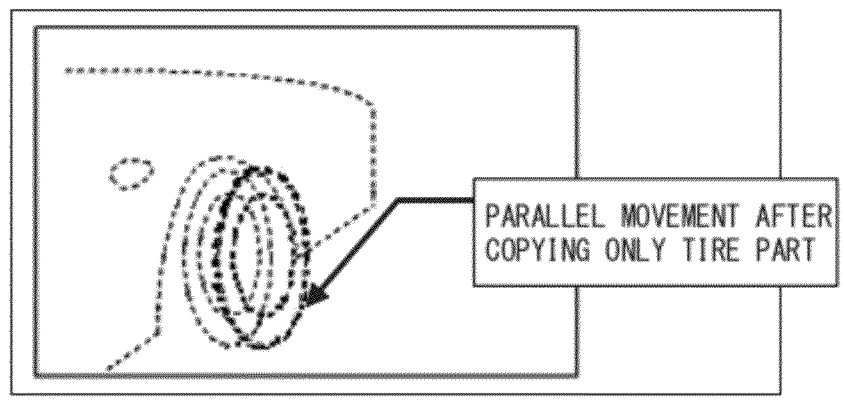
FIG. 16 is a monitor image view showing the main image (left side image) of the external monitor, where a tire part is shifted in parallel by the tire width and superimposed again.

To the contrary, in a supporting example 1, as shown in FIG. 15, the image including the tire, which is to be superimposed is shifted by a thickness of the tire inwardly (right side in the case of FIG. 15) and displayed. In this case, a profile line of the tire substantially corresponds to an inward profile line of the actual tire from the driver's viewpoint so that a sense for the tire thickness can be provided.

In a supporting example 2, as another method, instead of that the superimposed screen is shifted entirely as described above, an image of only a particular part including the tire is copied and superimposed again while considering the thickness of the tire so that the tire which is stereoscopic in itself is expressed. In this case, the inward profile line and an outward profile line are expressed and the sense for the tire thickness can be further provided than in the case shown in FIG. 15.

Figure 17:
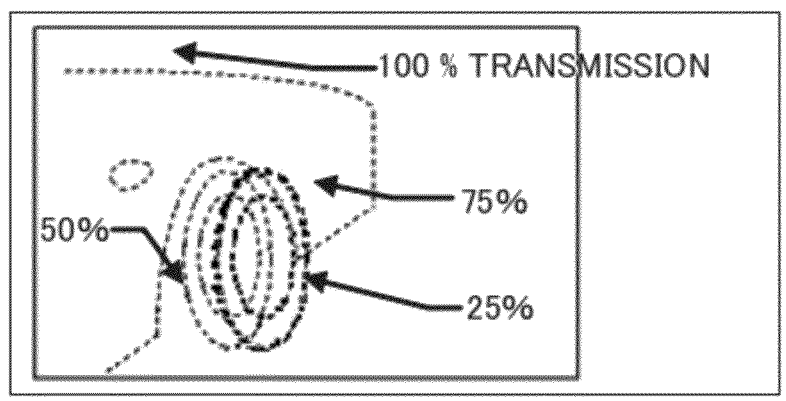
FIG. 17 is a monitor image view showing an example of the main image (left side image) of the external monitor, where the tire part is shifted in parallel by the tire width and superimposed again and transmissivity of the tire part is changed.

When the tire part is re-superimposed, transmissivity of the tire part is adjusted so that the tire is made clear from the other blind spot image to enhance visibility. For example, as shown in FIG. 17, transmissivity of a vehicle external part is set as 100%, that of a vehicle body part is set as 75%, that of the tire outward profile line is set as 50%, and that of the tire inward profile line is set as 25%, so that the tire part can be made clear from the other blind spot image. Furthermore, if not only transmissivity but together with saturation is changed and the part is superimposed, high visibility for avoidance of wheels falling in a side ditch on a road shoulder is provided and safe system can be constructed.

Next, effects will be explained.

According to the side-view monitor system A1 of Embodiment 1, the following effects can be obtained.

(1) In a vehicle periphery monitoring system (side-view monitor system A1) including a blind spot camera (left side camera 1, right side camera 2) imaging a blind spot area from a driver, an external monitor 4 set at a position in a vehicle interior to be visually confirmed by the driver, and a monitor display image data generating means (image processing controller 3) generating monitor display image data based on a real camera image input from the blind spot camera, the monitor display image data generating means (image processing controller 3) converts the real camera image from the blind spot camera (left side camera 1, right side camera 2), which includes a blind spot area into an image to be viewed from a driver's viewpoint to generate a blind spot image, and performs an image composition superimposing a semitransparent vehicle image which is obtained by making a vehicle viewed from the driver's viewpoint semitransparent and a semitransparent tire image which is obtained by making a tire semitransparent and displays a behavior following a handle operation by being viewed from the driver's viewpoint on the blind spot image to generate the monitor display image data expressing the blind spot through the semitransparent vehicle image and semitransparent tire image.

Accordingly, by matching the behavior of the semitransparent tire image to be superimposed with the operation from the driver's viewpoint, intuitive space perception without a feeling of strangeness can be assisted and the moving direction and behavior of the vehicle can be easily perceived. Hereinafter, specific effects will be described.

Since behaviors of the tire are matched with the actual handle operation and the movement of the vehicle, the feeling of strangeness is hardly caused and the image for eliminating a blind spot can be intuitively perceived.

Since the movement of the tire, especially a turning angle is perceived, a state for getting around an obstacle, such as a future moving direction of the vehicle, and the like can be easily perceived.

Since a position and side of the tire is an indicator for perceiving the vehicle body shape including a size of the vehicle body, a size and shape of an obstacle including a human in a blind spot can be easily perceived.

(2) The blind spot camera includes a left side camera 1 imaging a front left side area from the vehicle which is in a blind spot from the driver and a right side camera 2 imaging a front right side area from the vehicle which is in a blind spot from the driver. The monitor display image data generating means (image processing controller 3) divides the real camera image from the left side camera 1 into two of a left vehicle body image part including a left tire image and the other left periphery image part, divides the real camera image from the right side camera 2 into two of a right vehicle body image part including a right tire image and the other right periphery image part, replaces the left and right vehicle image parts with each other, combining the vehicle body image parts and the periphery image parts by the left and right replacement, and expresses the semitransparent tire image according to the behavior where a turning angle and a turning direction viewed from the driver's viewpoint follows the handle operation.

Accordingly, in a multi-camera vehicle, using the left and right side cameras 1, 2, the semitransparent tire image where the behavior of the tire is matched with the actual handle operation or the movement of the vehicle can be expressed.

(3) The monitor display image data generating means (image processing controller 3) sets a point which is obtained by converting the driver's viewpoint A in a line-symmetrical manner with a center axis of the vehicle as a line-symmetrical axis as an assistant driver's viewpoint B, performs a viewpoint conversion of one of the left or right periphery image parts (periphery images L2, R2) into a conversion image Ma2, Ga2 to be viewed from the driver's viewpoint A, performs a viewpoint conversion of the other one of the left or right vehicle body image parts (vehicle image R1, L1) into a semitransparent conversion image Gb1, Mb1 to be viewed from the assistant driver's viewpoint B and then performs a mirror image conversion of the semitransparent conversion image Gb1, Mb1 into a semitransparent mirror image conversion image Gb3, Mb3, and performs an image composition superimposing the semitransparent mirror image conversion image Gb3, Mb3 on the conversion image Ma2, Ga2 to generate one of the left and right monitor display image data.

Accordingly, disparity occurring when the vehicle body image part is expressed by switching between left and right is eliminated by setting the assistant driver's viewpoint B as the virtual viewpoint of the vehicle body image part. Therefore the vehicle body image part which is the same as that to be viewed from the driver's viewpoint A when combining onto the periphery image part to be viewed from the driver's viewpoint A can be expressed.

(4) The monitor display image data generating means (image processing controller 3) shifts the semitransparent mirror image conversion image Gb3, Mb3 to be superimposed on the conversion image Ma2, Ga2 in parallel in view of an actual tire width to express a tire thickness in the semitransparent tire image.

Accordingly, in the case where the tire does not have thickness and appears planar, the feeling of strangeness occurs in a tire movement when turning a handle or getting around an obstacle. However, by expressing a tire thickness with a simple image processing, the feeling of strangeness in the displayed tire movement can be prevented.

(5) The monitor display image data generating means (image processing controller 3) copies a part of an image of a specific part including a tire within the semitransparent mirror image conversion image Gb3, Mb3 to be superimposed on the conversion image Ma2, Ga2, shifts the copied part in parallel in view of an actual tire width, and superimposes the copied part shifted in parallel again to express a tire thickness in the semitransparent tire image.

Accordingly, in the case where the tire does not have thickness and appears planar, the feeling of strangeness occurs in a tire movement when turning a handle or getting around an obstacle. However, by expressing the tire thickness close to the actual tire, the displayed tire movement can be made close to the actual tire movement.

(6) The monitor display image data generating means (image processing controller 3) adjusts at least one of image expression elements of transmissivity, hue, saturation, and brightness of the semitransparent tire image so as to enhance visibility with respect to the other image part.

Accordingly, behavior information of the tire can be displayed on a monitor with a high distinguishability with respect to the other image information.

Embodiment 2 is an example where a tire is expressed by CG and a CG tire superimposed so as to be matched with a turning angle of a handle is movable.

The display of the tire position and the angle described in Embodiment 1 provides a positional relationship between the vehicle body shape and an external obstacle, information on the moving direction, and the like for the output periphery image and is very helpful for improvement of safety in a driving operation which often requires an instant judgment.

However, in the case of a system where a semitransparent vehicle interior image is superimposed on to a periphery image as disclosed in Japanese Patent Application No. 2008-039395 previously proposed by the Applicant, in the case where a camera is provided at only one of left and right sides, or in the case where a vehicle body image including a tire image cannot be obtained because of an angle or a position where the camera is installed, it is required to display a rudder angle information of the handle by any means. Embodiment 2 is proposed while addressing the point.

First, a configuration will be explained.

Figure 18:
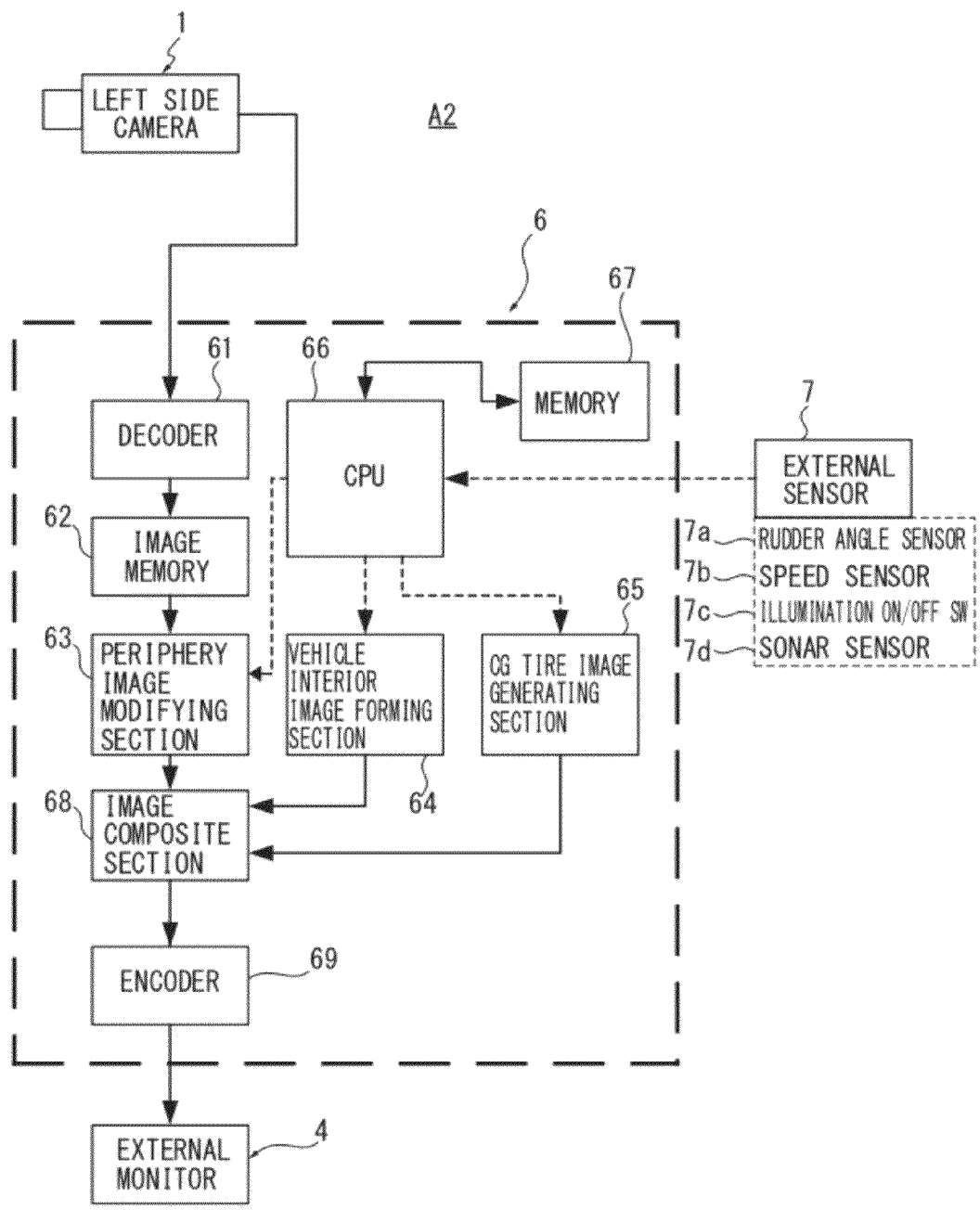
FIG. 18 is a system block diagram showing an entire system of a side-view monitor system A2 of Embodiment 2.

FIG. 18 is a system block diagram showing an entire system of a side-view monitor system A2 (an example of a vehicle periphery monitoring system) of Embodiment 2.

The side-view monitor system A2 of Embodiment 2 includes, as shown in FIG. 18, a left side camera 1 (blind spot camera), an external monitor 4, an image processing controller 6 (monitor display image data generating means), and an external sensor 7.

The left side camera 1 is installed in a left side mirror and images a left side front area of a vehicle, which is in a blind spot from the driver. Then, the left side camera 1 obtains real camera image data by an image pickup device (CCD, CMOS, or the like).

The external monitor 4 has a monitor screen by a liquid crystal display, a organic EL display, or the like and is set at a position (for example, a position of an instrumental panel) in a vehicle interior to be viewed by the driver.

The image processing controller 6 generates monitor display image data based on the real camera image input from the left side camera 1. Basically, the image processing controller 6 is formed by a system of an image processing block which performs a viewpoint conversion into a driver's viewpoint based on the camera image. Then, the image processing controller 6 superimposes the semitransparent vehicle interior image (semitransparent vehicle image) which is previously photographed from the driver's viewpoint and a semitransparent CG tire image T (semitransparent tire image) in conjunction with the rudder angle information on the periphery image (blind spot image) which is obtained by performing a viewpoint conversion into the driver's viewpoint.

The external sensor 7 is a sensor providing various external information and includes a rudder angle sensor 7a (rudder angle detection means), a speed sensor 7b, an illumination lamp switch 7c (external environment detection means), a sonar sensor 7d (obstacle detection means), and the like.

The image processing controller 6 includes, as shown in FIG. 17, a decoder 61, an image memory 62, a periphery image modifying section 63, a vehicle interior image forming section 64, a CG tire image generating section 65, a CPU 66, a memory 67, an image composite section 68 and an encoder 69.

The decoder 61 performs an analog-digital conversion of the real camera image input from the left side camera 1 and stores the image in the image memory 62.

The periphery image modifying section 63 divides the real camera image data from the image memory 62 into a vehicle body image and a periphery image (blind spot image), projects the periphery image on a virtual horizontal screen therefrom and performs a modifying processing by a viewpoint conversion processing to form an image to be viewed from the driver's viewpoint A.

The vehicle interior image forming section 64, when performing an image composite processing, loads the vehicle interior image data, which is previously photographed from the driver's viewpoint, and adjusts transmissivity of the vehicle interior image data to form a semitransparent vehicle interior image.

The CG tire image generating section 65, when performing an image composite processing, loads CG tire image data which is the closest one from a plurality of CG tire image data based on a rudder angle information, and performs a modifying processing to generate a semitransparent CG tire image T corresponding to the rudder angle information.

The CPU 66 is a central processing circuit managing all information processings and control outputs with respect to image processings and in the CPU 66, a control program performing various image processing controls such as a viewpoint conversion, image composition, and the like.

The memory 67 stores the vehicle interior image data which is previously photographed from the driver's viewpoint, the plurality of CG tire image data and the like and performs a data loading out by a command from the CPU 66.

The image composite section 68 performs a composite processing by superimposing the semitransparent vehicle interior image from the vehicle interior image forming section 64, the semitransparent CG tire image T from the CG tire image generating section 65 on the periphery image from the periphery image modifying section 63, finally adjusts luminance, hue, saturation, transparency and the like, and outputs composite image data.

The encoder 69 performs an analog-digital conversion on the composite image from the image composite section 68 to generate image data to be displayed on the external monitor 4.

Figure 19:
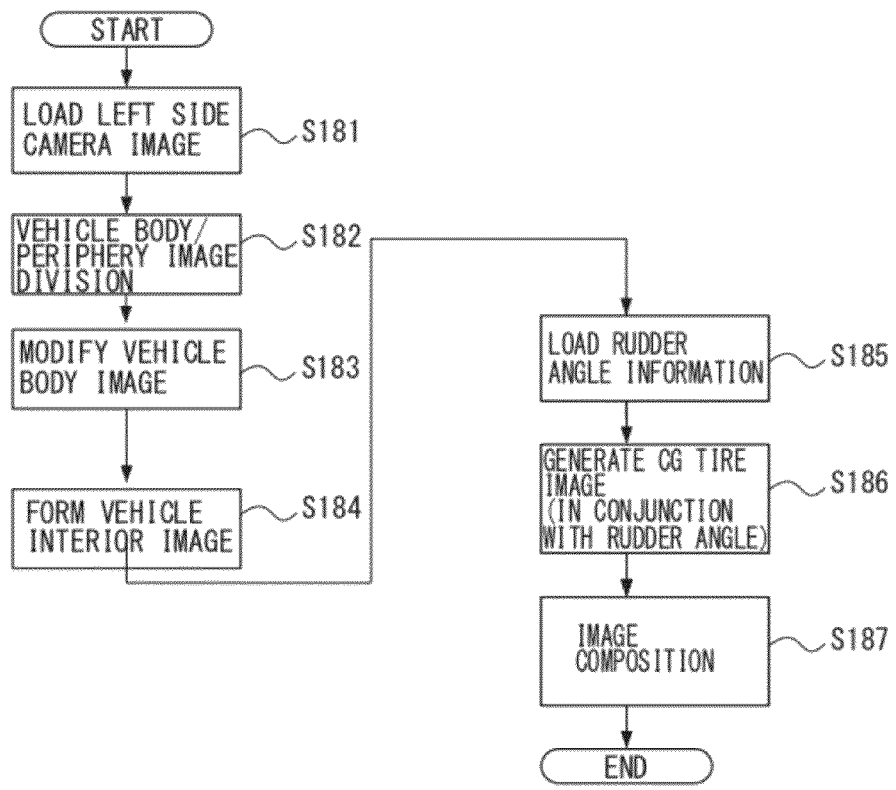
FIG. 19 is a flowchart showing a flow of an image composite processing performed in an image processing controller 6 of the side-view monitor system A2 of Embodiment 2.

FIG. 19 is a flowchart showing a flow of an image composite processing performed in an image processing controller 6 of the side-view monitor system A2 of Embodiment 2. Hereinafter, each step in FIG. 19 will be explained.

In step S181, the real camera image data is loaded from the left side camera 1 and the process moves to step S182.

In step S182, following the loading the left side camera image data in step S181, the camera image data from the left side camera 1 is divided into two of vehicle body image data and periphery image data and the process moves to step S183.

In step S183, following the vehicle body/periphery image division in step S182, the periphery image is projected on a virtual horizontal screen and a modifying processing into an image to be viewed from the driver's viewpoint by performing a viewpoint conversion and the process moves to step S184.

In step S184, following the modification of the periphery image in step S183, the vehicle interior image data previously photographed from the driver's viewpoint is loaded, transmissivity of the vehicle interior image data is adjusted to form a semitransparent vehicle interior image, and the process moves to step S185.

In step S185, following the formation of the vehicle interior image in step S184, rudder angle information from the rudder angle sensor 7a is loaded and the process moves to step S186.

In step S186, following loading the rudder angle information in step S185, the closest CG tire image data is loaded from a plurality of CG tire image data based on the rudder angle information, a semitransparent CG tire image T corresponding to the rudder angle information is generated by performing a modifying processing, and the process moves to step S187.

Figure 20:
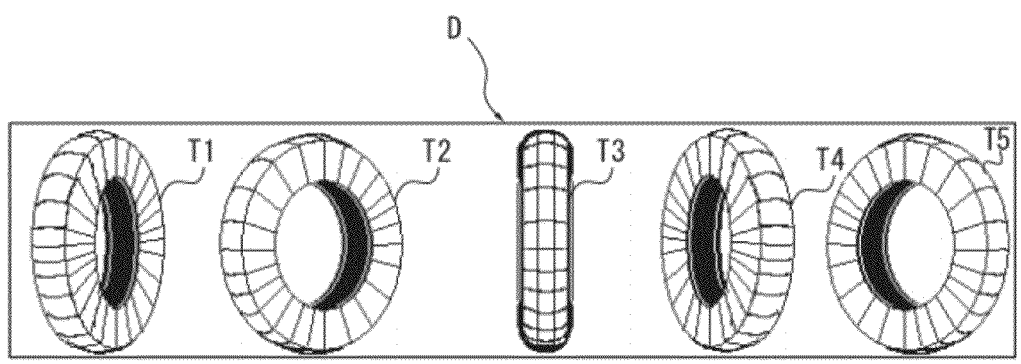
FIG. 20 is a view showing an example of a plurality of CG tire image data D to be superimposed.

Here, as the plurality of CG tire image data D, for example, as shown in FIG. 20, an actual tire set with different angles is used as a model, and a plurality of CG tire images T1, T2, T3, T4, T5 which are drawn in a stereoscopic form as being viewed are stored.

In step S187, following the generation of the semitransparent CG tire image T in step S186, the semitransparent vehicle interior image obtained in step S184 and the semitransparent CG tire image T obtained in step S186 are superimposed on the periphery image obtained in step S183 and combined and the process moves to end.

Next, an operation will be explained.

The Applicant has proposed in Japanese Patent Application No. 2008-039395 that only periphery image part which is projected on a virtual horizontal screen and converted into an image to be viewed from the driver's viewpoint is used, a vehicle interior still image is used as a semitransparent image to be superimposed on the periphery image part and thereby an image as if it is viewed through from the vehicle interior to outside is implemented.

However, in the above proposal, since the semitransparent image is superimposed based on the vehicle interior still image, tire behavior information by a handle operation cannot be displayed and there is insufficiency in this point. Then, in Embodiment 2, it has been proposed that the tire image is replaced by CG to be superimposed and displayed while superimposing the semitransparent vehicle interior image. After obtaining a handle turning angle, based on the data, the CG tire image is changed and displayed so that an intuitive space perception is assisted.

Figure 21:
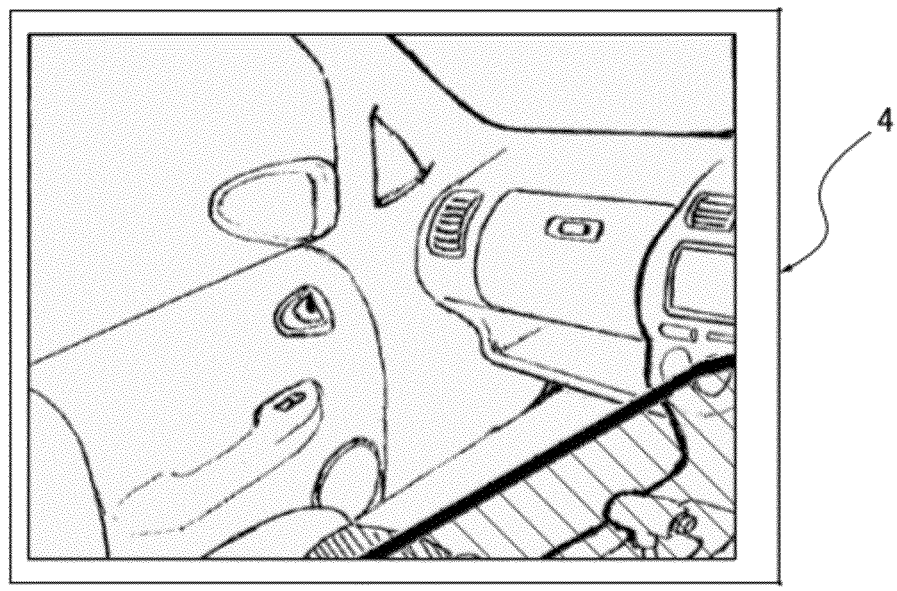
FIG. 21 is a monitor image view showing an example where a semitransparent vehicle interior image is superimposed on a periphery image which is obtained by being converted into an image to be viewed from the driver's viewpoint.

First, if the semitransparent vehicle interior image is superimposed on the periphery image converted into an image to be viewed from the driver's viewpoint, a monitor image as shown in FIG. 21 can be obtained. Thereby, the monitor image as if outside of the vehicle, which is in a blind spot, is viewed through from the vehicle interior is implemented so that the intuitive space perception can be assisted.

In addition to this, in Embodiment 2, the rudder angle information of the handle is input from the rudder angle sensor 7a to the CPU 66, the semitransparent CG tire image T which is adapted to the rudder angle obtained by the information is generated by the CG tire image generating section 65. A viewpoint conversion is performed on the semitransparent CG tire image T as well as on the periphery image and the vehicle interior image, and the modification so as to the image as if it is viewed from the driver's viewpoint is previously performed. Then, the semitransparent vehicle interior image is superimposed on the periphery image and the semitransparent CG tire image T is superimposed at a position where the tire is to be in itself.

Figure 22:
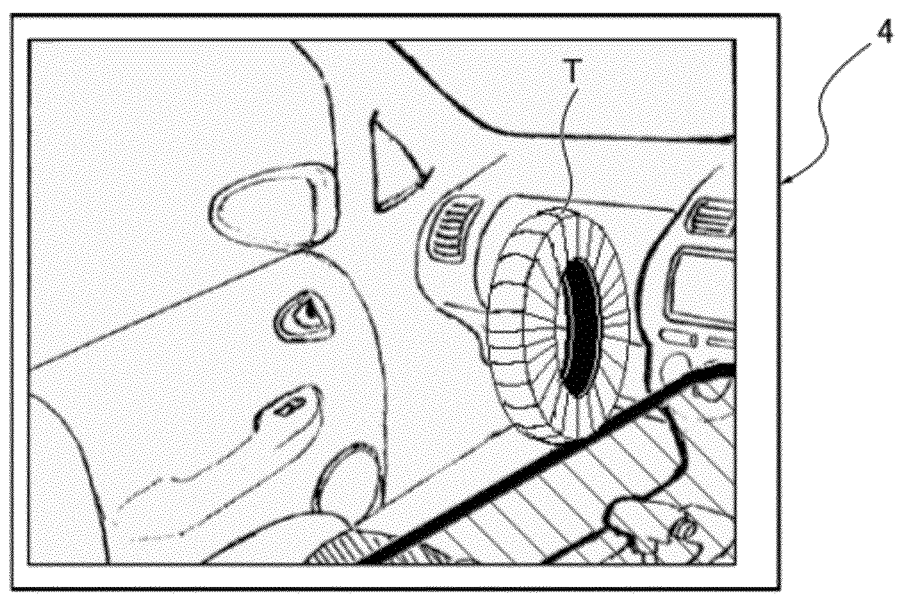
FIG. 22 is a monitor image view showing an example where the semitransparent vehicle interior image and a semitransparent CG tire image with a tire turning angle of 0 degree are superimposed on the periphery image which is obtained by being converted into an image to be viewed from the driver's viewpoint.
Figure 23:
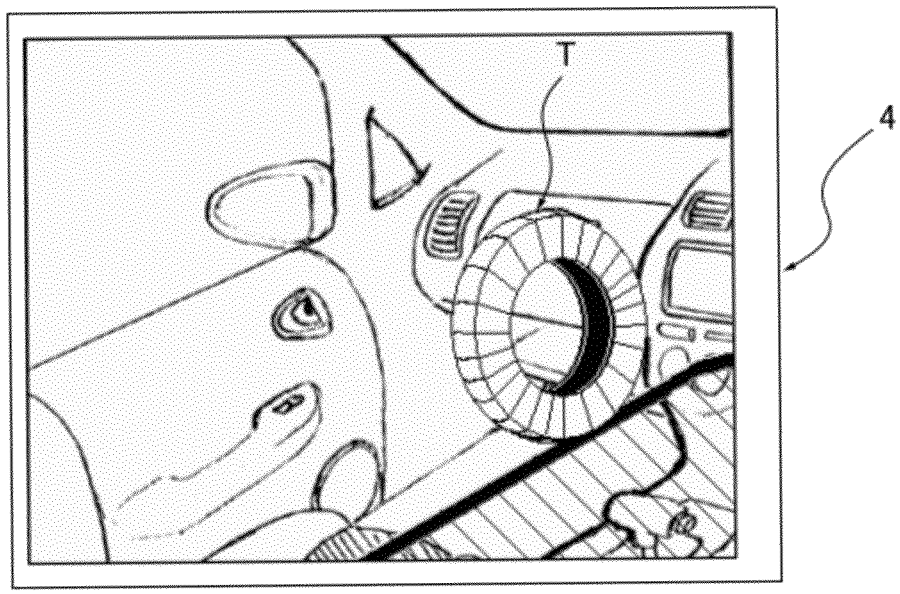
FIG. 23 is a monitor image view showing an example where the semitransparent vehicle interior image and a semitransparent CG tire image of a tire turning right are superimposed on the periphery image which is obtained by being converted into an image to be viewed from the driver's viewpoint.
Figure 24:
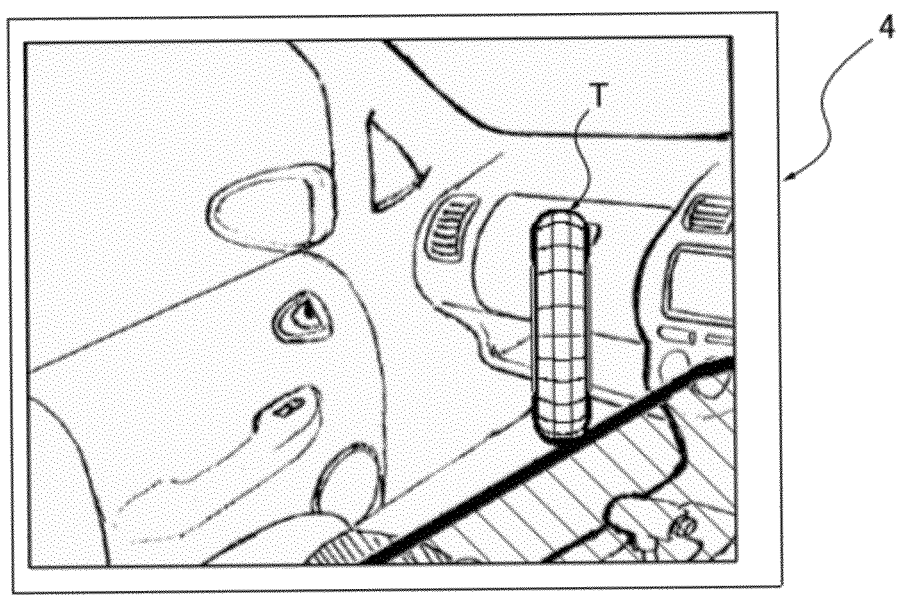
FIG. 24 is a monitor image view showing an example where the semitransparent vehicle interior image and a semitransparent CG tire image of a tire turning left are superimposed on the periphery image which is obtained by being converted into an image to be viewed from the driver's viewpoint.

Therefore, in a state where the vehicle runs straight (i.e., the tire turning angle=0 degree), the semitransparent CG tire image T directed in the vehicle forward and back directions is superimposed as shown in FIG. 22. In a state where the vehicle is turning right (i.e., turning the tire right), the semitransparent CG tire image T where the tire is turned right is superimposed as shown in FIG. 23. In a state where the vehicle is turning left (i.e., turning the tire left), the semitransparent CG tire image T where the tire is turned left is superimposed as shown in FIG. 24.

Here, the conversion processing of the semitransparent CG tire image T may be performed by performing calculation, modification and generation every time the rudder angle changes, may be performed by performing a previous generation when basic parameters such as a position of the driver's viewpoint and the like and storage in the memory 67 set at an external of the CPU 66 or the like to reduce the calculation time.

Furthermore, at the point when the semitransparent CG tire image T is superimposed, for example, according to ON/OFF of the illumination switch 7c or brightness/darkness outside of the vehicle, and the like, hue, saturation or the like of the semitransparent CG tire image T is changed so as to make distinguishability from the periphery image clear. For example, when it is getting dark, or the like, if a color of the periphery image becomes dark, the semitransparent CG tire image T blends into the periphery image to degrade the distinguishability. To the contrary, according to the change of the external environment, the semitransparent CG tire image T is prevented from blending into the color of the periphery image to degrade the distinguishability and the distinguishability of the semitransparent CG tire image T can be ensured.

For example, in conjunction with the obstacle detection means such as the sonar sensor 7d, in the case where there is a relatively approaching obstacle, the color of the semitransparent CG tire image T is changed to red which is an alarm color. That is, the obstacle alarm display is performed by the semitransparent CG tire image T as a representative. Therefore, by expressing the alarm information from the obstacle through the semitransparent CG tire image T, contribution to safety can be provided.

Next, effects will be explained.

According to the side-view monitor system A2 of Embodiment 2, the following effects can be obtained in addition to the effects (1) of Embodiment 1.

(7) The blind spot camera is a single side camera (left side camera 1) imaging a front side area from the vehicle which is in a blind spot from the driver. A rudder angle detection means (rudder angle sensor 7a) detecting a handle operation rudder angle is provided. The monitor display image data generating means (image processing controller 6) draws a tire corresponding to a rudder angle based on the rudder angle information from the rudder angle detection means (rudder angle sensor 7a) by computer graphics to generate the semitransparent tire image (semitransparent CG tire image T), performs an image composition superimposing the semitransparent tire image (semitransparent CG tire image) on a tire position where the tire is to be positioned to express the semitransparent tire image according to the behavior where a turning angle and a turning direction viewed from the driver's viewpoint follows the handle operation.

Accordingly, in a vehicle which has a camera only at a left or right side or in a vehicle having a periphery monitoring camera which is not able to obtain the vehicle body image including the tire image, by using one side camera (left side camera 1), the semitransparent tire image where the tire behavior is matched with the actual handle operation or the vehicle movement can be expressed.

(8) The monitor display image data generating means (image processing controller 6) performs an image composition superimposing the semitransparent vehicle interior image obtained based on a vehicle interior image which is obtained by previously photographing a vehicle interior from the driver's viewpoint and the semitransparent tire image (semitransparent CG tire image T) which is stereoscopically drawn by the computer graphics on the periphery image to be viewed from the driver's viewpoint, which is obtained by performing the viewpoint conversion of the camera image from the single side camera to generate the monitor display image data.

Accordingly, the monitor image which is as if a vehicle exterior in a blind spot is viewed through from the vehicle interior from the driver's viewpoint is provided so that an intuitive space perception is assisted and the tire behavior information by the handle operation can be displayed without degrading the space perception by the stereoscopically drawn semitransparent tire image.

(9) An external environment detection means (illumination switch 7c) detecting a hue, a saturation, or a brightness of an external environment of the vehicle is provided. The monitor display image data generating means (image processing controller 6) changes at least one of the hue, saturation, and brightness of the semitransparent tire image (semitransparent CG tire image T) which is drawn by computer graphics according to the hue or brightness of the external environment, which are detected by the external environment detection means (illumination switch 7c) so as to enhance visibility for the blind spot image.

Accordingly, regardless of change of the external environment, the tire behavior information by the handle operation can be displayed with high distinguishability.

(10) An obstacle detection means (sonar sensor 7d) detecting an obstacle approaching periphery of the vehicle. The monitor display image data generating means (image processing controller 6) changes color of the semitransparent tire image drawn by computer graphics into an alarm color when the approach of the obstacle is detected by the obstacle detection means (sonar sensor 7d).

Accordingly, by expressing the alarm information from the obstacle through the semitransparent tire image which is drawn by CG, avoiding operation from the obstacle can be started with a good response and contribution to safety can be provided.

While the vehicle periphery monitoring system of the present invention has been explained as described above based on Embodiment 1 and Embodiment 2, specific configurations are not limited thereto and it is to be understood that variations and modifications will be apparent without departing from the scope of the claimed invention according to each claim.

In Embodiment 1, it is supposed that the vehicle body images included in the left and right side cameras 1, 2 do not have substantial difference in a design. However, in the case where there are differences in designs such as shapes or paints between left and right, and the difference is not negligible, instead of the entire vehicle, only round tire parts or images within comparatively narrow ranges including tire houses may be replaced. In this case, the superimposed image which is similar to that of Embodiment 1 may be generated.

In Embodiment 2, the example is shown in which the left side camera 1 is used, the semitransparent vehicle interior image and the semitransparent CG tire image from the driver's viewpoint are superimposed on the periphery image form the driver's viewpoint. However, an example may be included in which the camera image from the left side camera 1 is divided into the periphery image and the vehicle body image, the periphery image and the vehicle body image from the driver's viewpoint are generated, and the semitransparent vehicle body image (excluding a tire image) and the semitransparent CG tire image from the driver's viewpoint are superimposed on the periphery image from the driver's viewpoint.

INDUSTRIAL APPLICABILITY

In Embodiments 1, 2, the application examples to the side-view monitor system where a side camera imaging a front side area from the vehicle, which is in a blind spot from the driver is installed are shown. However, the present invention may be applied to a vehicle periphery monitoring system which has a blind spot camera imaging an area which is in a blind spot from the driver and expresses a blind spot image through a semitransparent vehicle image and a semitransparent tire image from the driver's viewpoint, such as a back-view monitor system, a front-view monitor system, an around-view monitor system, or the like.

The invention claimed is:

1. A vehicle periphery monitoring system, comprising:
   a left side camera, imaging a front left side area from the vehicle which is in a blind spot from a driver;
   a right side camera, imaging a front right side area from the vehicle which is in a blind spot from the driver;
   an external monitor set at a position in a vehicle interior to be visually confirmed by the driver; and
   a monitor display image data generator, generating monitor display image data based on right and left side real camera images which are input from the right side camera and the left side camera, respectively, wherein
   the monitor display image data generator;
   divides the left side real camera image into two of a left vehicle body image part including a left tire image and the other left periphery image part,
   divides the right side real camera image into two of a right vehicle body image part including a right tire image and the other right periphery image part,
   sets a point as an assistant driver's viewpoint, which is obtained by converting a driver's viewpoint in a line-symmetrical manner with a center axis of the vehicle as a line-symmetrical axis,
   performs a viewpoint conversion of the periphery image part of one of the left and right side real camera images into a conversion image to be viewed from the driver's viewpoint,
   performs a viewpoint conversion of the vehicle body image part of the other one of the left and right side real camera images into a semitransparent conversion image to be viewed from the assistant driver's viewpoint, and
   then performs a mirror image conversion of the semitransparent conversion image into a semitransparent mirrored conversion image, and performs an image composition, superimposing the semitransparent mirrored conversion image on the conversion image to generate the monitor display image data, and
   wherein
   the monitor display image data generator copies a part of an image of a specific part including a tire within the semitransparent mirrored conversion image to be superimposed on the conversion image,
   shifts the copied part in parallel in view of an actual tire width, and
   superimposes the copied part shifted in parallel again to express a tire thickness.

2. The vehicle periphery monitoring system according to claim 1, wherein
   the monitor display image data generator adjusts transmissivity of a tire portion within the semitransparent mirrored conversion image so as to enhance visibility with respect to the other image part.

* * * * *